United States Patent [19]
Yoshida et al.

[11] Patent Number: 5,113,411
[45] Date of Patent: May 12, 1992

[54] MODULATOR AND DEMODULATOR FOR DATA TRANSMISSION SYSTEMS

[75] Inventors: Atsushi Yoshida, Tokyo; Hisashi Oishi, Shizuoka, both of Japan

[73] Assignee: NEC Corporation, Japan

[21] Appl. No.: 560,389

[22] Filed: Jul. 31, 1990

[30] Foreign Application Priority Data

Jul. 31, 1989 [JP] Japan .................... 1-196681

[51] Int. Cl.⁵ .................... H03H 7/30; H04L 27/00
[52] U.S. Cl. .................... 375/13; 375/38; 375/94; 371/43
[58] Field of Search .................... 375/7, 8, 37, 39, 94; 371/43, 44, 45

[56] References Cited

U.S. PATENT DOCUMENTS

| | | | |
|---|---|---|---|
| 4,037,049 | 7/1977 | Lyon | 375/8 |
| 4,780,883 | 10/1988 | O'Connor et al. | 375/7 |
| 4,837,766 | 6/1989 | Yoshida | 371/43 |
| 4,945,549 | 7/1990 | Simon et al. | 375/57 |
| 4,967,413 | 10/1990 | Otani | 371/43 |

Primary Examiner—Benedict V. Safourek
Assistant Examiner—Young Tse
Attorney, Agent, or Firm—Ostrolenk, Faber, Gerb & Soffen

[57] ABSTRACT

A MODEM has a delay equalizer for receiving a trellis-coded test signal transmitted from an opposite MODEM and compensating for delay distortion of this test signal on the transmission path. The output of this delay equalizer and the input test signal are selectively entered into a demodulator. The output of this demodulator is assigned to predetermined signal point coordinates by a decision circuit. A Viterbi decoder computes a branch metric representing the distance between each assigned point and receive signal point from the output signals of the decision circuit and the demodulator, and figures out the pass metrics of accumulated values based on the branch metrics so computed. A difference signal represents the difference between the maximum and minimum values of the pass metrics from the Viterbi decoder. A first difference signal corresponds to the pass metrics when the delay equalizer is not set for the transmission path, and a second difference signal corresponds to the pass metrics when the delay equalizer is set for the transmission path. A control circuit compares the first and second difference signals and sets the delay equalizer out of the transmission path if the first difference signal is greater than the second, or sets the delay equalizer in the transmission path if the second difference signal is greater than the first. Thus the MODEM automatically decides whether the delay equalizer is to be inserted in the transmission path.

9 Claims, 9 Drawing Sheets

| INPUTS | | PREVIOUS OUTPUTS | | OUTPUTS | |
|---|---|---|---|---|---|
| $Q_{1n}$ | $Q_{2n}$ | $Y_{1n-1}$ | $Y_{2n-1}$ | $Y_{1n}$ | $Y_{2n}$ |
| 0 0 0 0   0 0 0 0   1 1 1 1   1 1 1 1 | 0 0 0 0   1 1 1 1   0 0 0 0   1 1 1 1 | 0 0 1 1   0 0 1 1   0 0 1 1   0 0 1 1 | 0 1 0 1   0 1 0 1   0 1 0 1   0 1 0 1 | 0 0 1 1   0 0 1 1   1 1 0 0   1 1 0 0 | 0 1 0 1   1 0 1 0   0 1 1 0   1 0 0 1 |

Fig. 3 ered to as
MODULATOR AND DEMODULATOR FOR DATA TRANSMISSION SYSTEMS

BACKGROUND OF THE INVENTION

The present invention relates to a modulating and demodulating device (hereinafter referred to as MODEM) for data transmission systems, and more particularly to a modem capable of automatically determining whether to set the delay equalizer or not.

A data transmission system links a data processing apparatus with a data input/output apparatus or data processing apparatus together, located in distance from each other, for the transmission of information between them. For this purpose, a data transmission system is composed of various transmission paths and transmitting apparatuses. Data processing apparatuses and data input/output apparatuses are collectively called data terminal equipment (DTE). Data transmitting apparatuses in a data transmission system are known as data circuit terminating equipment (DCE). A MODEM, a typical example of DCE, achieves reciprocal conversion between the signal interfacing conditions between DTE units and those on transmission paths.

Usually, a MODEM in such a data transmission system is provided with a delay equalizer to compensate for delay distortion, and sometimes group delay distortion, to which the transmitted data may suffer on the transmission path. Group delay distortion on a telephone line, used as the transmission path between MODEM's opposite to each other, varies in characteristic with the number of links on the line and other factors. On an exclusive line, the characteristic of group delay distortion is determined when the line is laid, and basically is subject to no major subsequent change. Therefore, the delay equalizer is set by the installing technician at the time of installing the MODEM on the basis of the group delay distortion characteristic of the line which he determines by an actual data transmission test using the MODEM. In this setting procedure, the technician comparatively observes the eye patterns on an oscilloscope or some other precision instrument when the delay equalizer is inserted on the line and when not. Based on the result of this comparative test, the technician judges whether or not the delay equalizer should be set.

However, the above described setting procedure for the delay equalizer requires not only a precision instrument such as an oscilloscope but also a skilled technician for the installation work.

SUMMARY OF THE INVENTION

An object of the present invention, therefore, is to provide a MODEM for data transmission systems, which can automatically set the delay equalizer without requiring any special measuring instrument or its operation.

Another object of the invention is to provide a MODEM for data transmission systems, which requires no skilled technician, i.e. which allows a lay user to readily decide whether or not to set the delay equalizer.

A MODEM for data transmission systems according to one aspect of the invention is provided with a delay equalizer for receiving via a transmission path a trellis-coded test signal transmitted from an opposite MODEM and compensating for delay distortion on the transmission path of the test signal. A first switch selectively supplies the test signal, which is the output of the delay equalizer, and the test signal entered via the transmission path. A demodulator demodulates the output signals of the first switch. A decision circuit assigns the output signals of the demodulator to predetermined signal point coordinates. The MODEM is also provided with a Viterbi decoding circuit for computing the branch metric representing the distance between each assigned point and receive signal point from the output signals of the decision circuit and the demodulator, and figures out the pass metrics of accumulated values based on the computed branch metric. An arithmetic processing circuit selects the maximum and the minimum of the branch metrics from the Viterbi decoding circuit, and determines and outputs the difference between the selected maximum and minimum as a difference signal. The MODEM is further provided with a second switch for supplying the difference signal determined by the arithmetic processing circuit as a first difference signal corresponding to the pass metrics when the delay equalizer is not set for the transmission path and as a second difference signal corresponding to the pass metrics when the delay equalizer is set for the transmission path. A controller compares the first and second difference signals supplied by the second switch, and sets the first switch in a state not to set the delay equalizer for the transmission path if the first difference signal is greater than the second, or sets the first switch in a state to set the delay equalizer for the transmission path if the second difference signal is greater than the first.

BRIEF DESCRIPTION OF THE DRAWINGS

The above and other objects and features of the present invention may be fully understood from the following detailed description and the accompanying drawings in which:

FIGS. 2 to 6 are diagrams for describing the trellis coder in FIG. 1;

In the drawings, identical numerals denote respectively identical structural elements.

DETAILED DESCRIPTION OF THE PREFERRED EMBODIMENT

Figure 1:
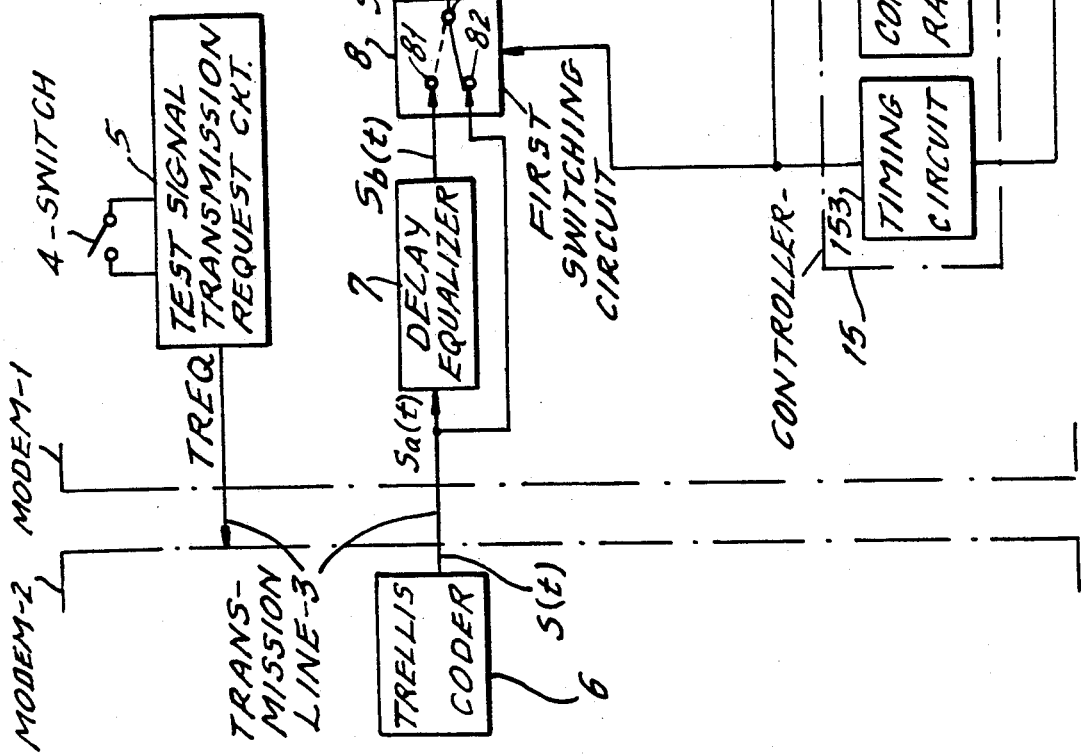
FIG. 1 illustrates a preferred embodiment of the invention.

FIG. 1 illustrates a preferred embodiment of the present invention with respect to a data transmission system in which a first MODEM 1 and a second MODEM 2 are connected to each other via a transmission path (exclusive line) 3. Whereas the MODEM's 1 and 2 opposite to each other are identical in configuration, FIG. 1 illustrates only the relevant parts of the system to the two MODEM's in an arrangement in which the MODEM 1 is on the receiving side, and the MODEM 2 is on the transmitting side, of a test signal needed for automatic setting of a delay equalizer. In the MODEM 1, a starter switch 4 is provided on the control board of the MODEM 1. A test signal transmission request circuit 5 transmits a transmission request signal TREQ for a test signal to the opposite MODEM 2 via the transmission path 3 when the switch 4 is turned on. Upon receiving the transmission request signal TREQ sent from the request circuit 5 of the MODEM 1 via the transmission path 3, the MODEM 2 prepares a trellis coding test signal S(t), and sends this test signal to the opposite MODEM 1 via the transmission path 3. Because of this procedure, the MODEM 2 is equipped with a trellis coder 6.

Figure 2:
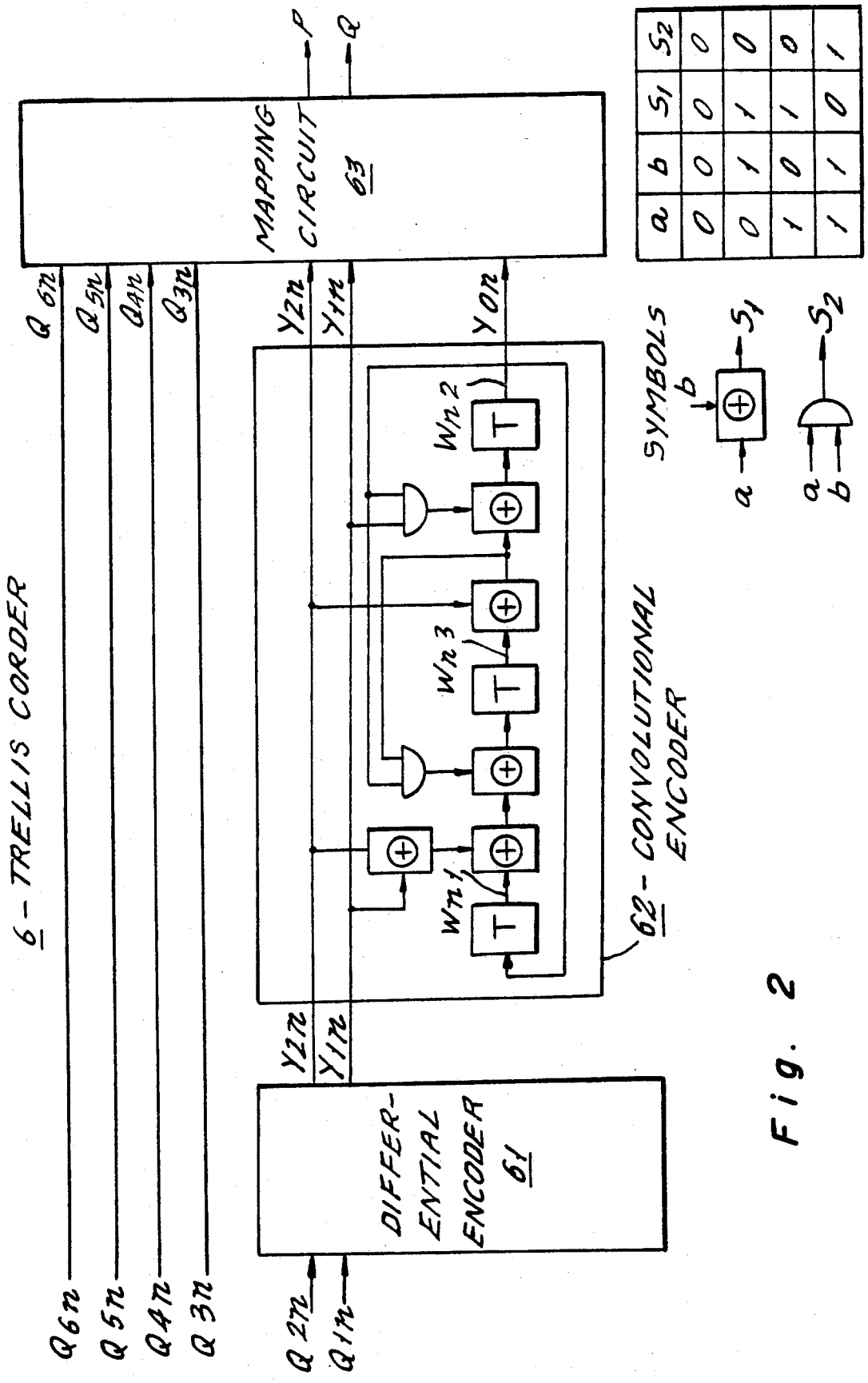

Hereupon, the trellis coder 6 will be described in detail. Trellis coding is a way of coding for data transmission, intended to increase the allowance for noise on the line and improving the S/N versus error rate characteristic. The trellis coder 6 for generating a test signal having undergone this trellis coding can have the configuration specified in the CCITT Recommendation V.33. Referring to FIG. 2, the trellis coder 6 consists of a differential encoder 61 and a convolutional encoder 62. In this trellis coder 6, the data to be transmitted are divided into six bits $Q_{6n} \ldots Q_{1n}$ each, and inputted in parallel. Out of these six data bits, four ($Q_{6n}$, $Q_{5n}$, $Q_{4n}$ and $Q_{3n}$) are not coded, but only the other two ($Q_{2n}$ and $Q_{1n}$) are coded. The differential encoder 61, as the truth table of FIG. 3 shows, compares the inputs $Q_{1n}$ and $Q_{2n}$ with prior inputs $Y_{1n-1}$ and $Y_{2n-1}$, which are the previous outputs, and sends out new outputs $Y_{1n}$ and $Y_{2n}$. The operation of this differential encoder 61 is similar to the differential modulation system in the phase shift keying (PSK) system and the quadrature amplitude modulation (QAM) system, by which the data to be transmitted are converted into phase variation quantities of the carrier signal and, although an error arises at the moment of any instantaneous phase variation due to a phase hit or the like, the subsequent data are unaffected.

Figure 4:
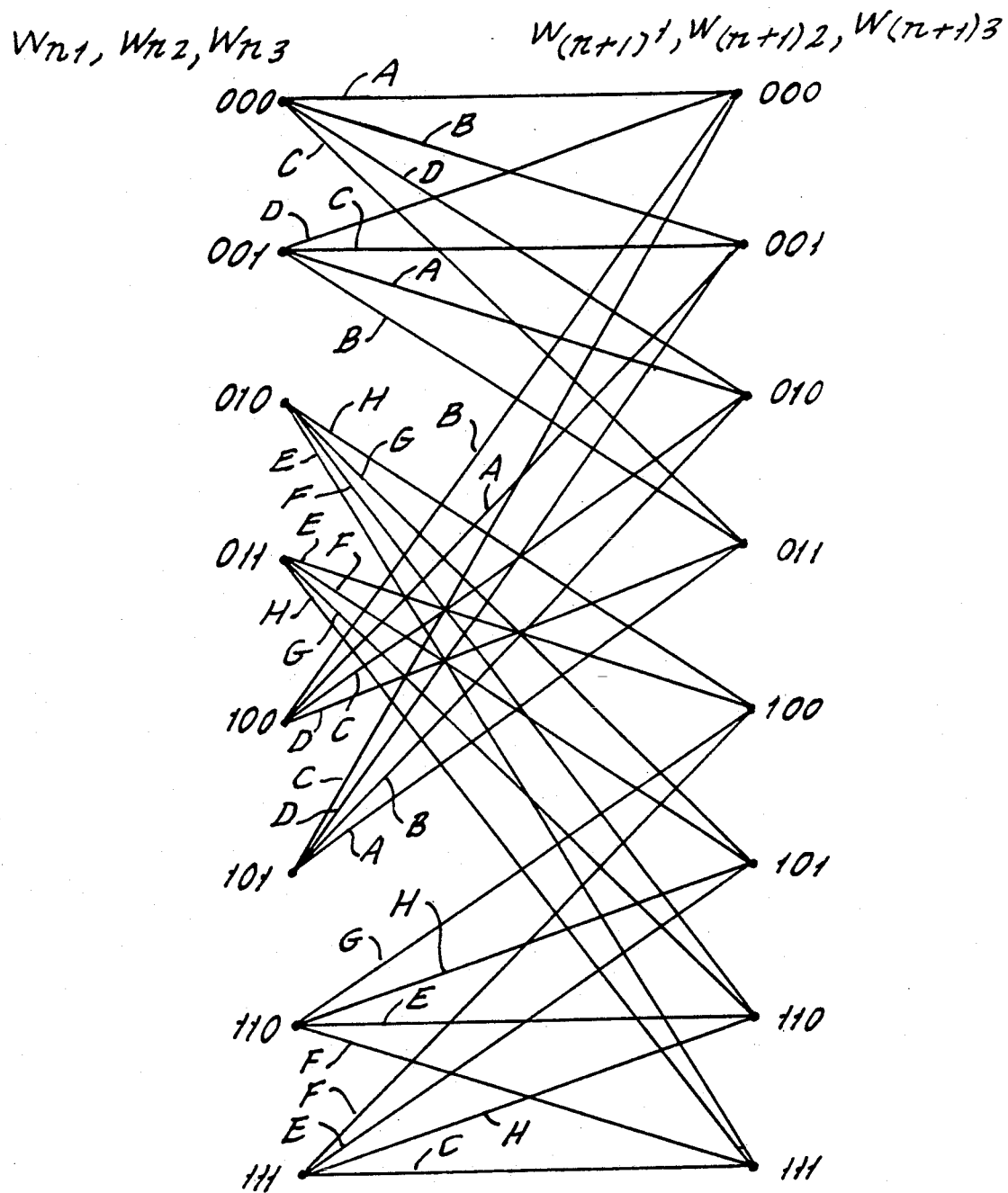

The convolutional encoder 62 subjects the outputs $Y_{1n}$ and $Y_{2n}$ of the differential encoder 61 to trellis coding. A redundant bit $Y_{0n}$ is added in the convolutional encoder 62, whose encoded outputs include three bits, $Y_{2n}$, $Y_{1n}$ and $Y_{0n}$. This convolutional encoder 62 can have eight different states according to the contents $W_{n1}$, $W_{n2}$ and $W_{n3}$ of three delays (T). When there is a change from one state to the next, the state into which the change can take place is limited to one of four out of the eight, and the change is governed by the inputs $Y_{1n}$ and $Y_{2n}$. The state transitions possible in eight-state trellis coding are shown in FIG. 4. For instance, if the states $W_{n1}$, $W_{n2}$ and $W_{n3}$ are 000 at a time n, the states $W_{(n+1)1}$, $W_{(n+1)2}$ and $W_{(n+1)3}$ at a time n+1 will be one of 000, 001, 010 and 011. The outputs of the convolutional encoder 62 are three bits including the redundant bit $Y_{0n}$ and inputs $Y_{1n}$ and $Y_{2n}$. Since the redundant bit $Y_{0n}$ at the time n is the same as the content $W_{n2}$ of the delay, unaffected by the inputs $Y_{1n}$ and $Y_{2n}$ at the same time, the alternatives of the outputs are limited to four out of the eight kinds. As shown in FIG. 4, letters A, B, ..., H assigned to lines representing state transitions are the outputs in the respective transitions. Thus, for the outputs $Y_{2n}$, $Y_{1n}$ and $Y_{0n}$, A=000, B=010, C=100, D=110, E=011, F=101, G=111 and J=001. For instance, when there is the state of $W_{n1}$, $W_{n2}$ and $W_{n3}$=000, if 00, 01, 10 and 11 are entered as the inputs $Y_{1n}$ and $Y_{2n}$, each of the transitional states $W_{(n+1)1}$, $W_{(n+1)2}$ and $W_{(n+1)3}$ will have the alternatives of 000, 011, 001 and 010. At this time, the outputs of the convolutional encoder 62 will be 000=A, 010=B, 100=C and 110=D.

Figure 5:
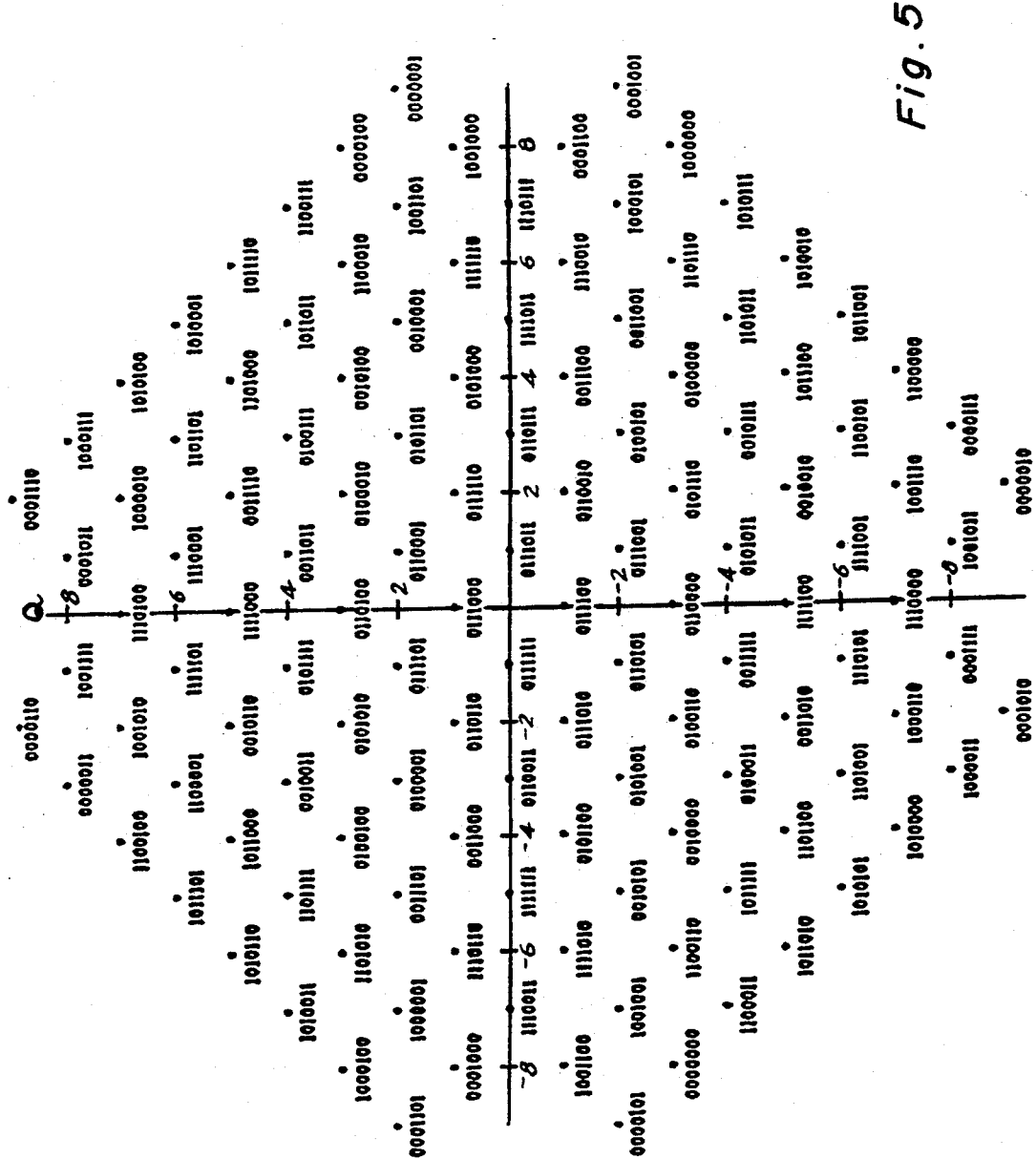
Figure 6:
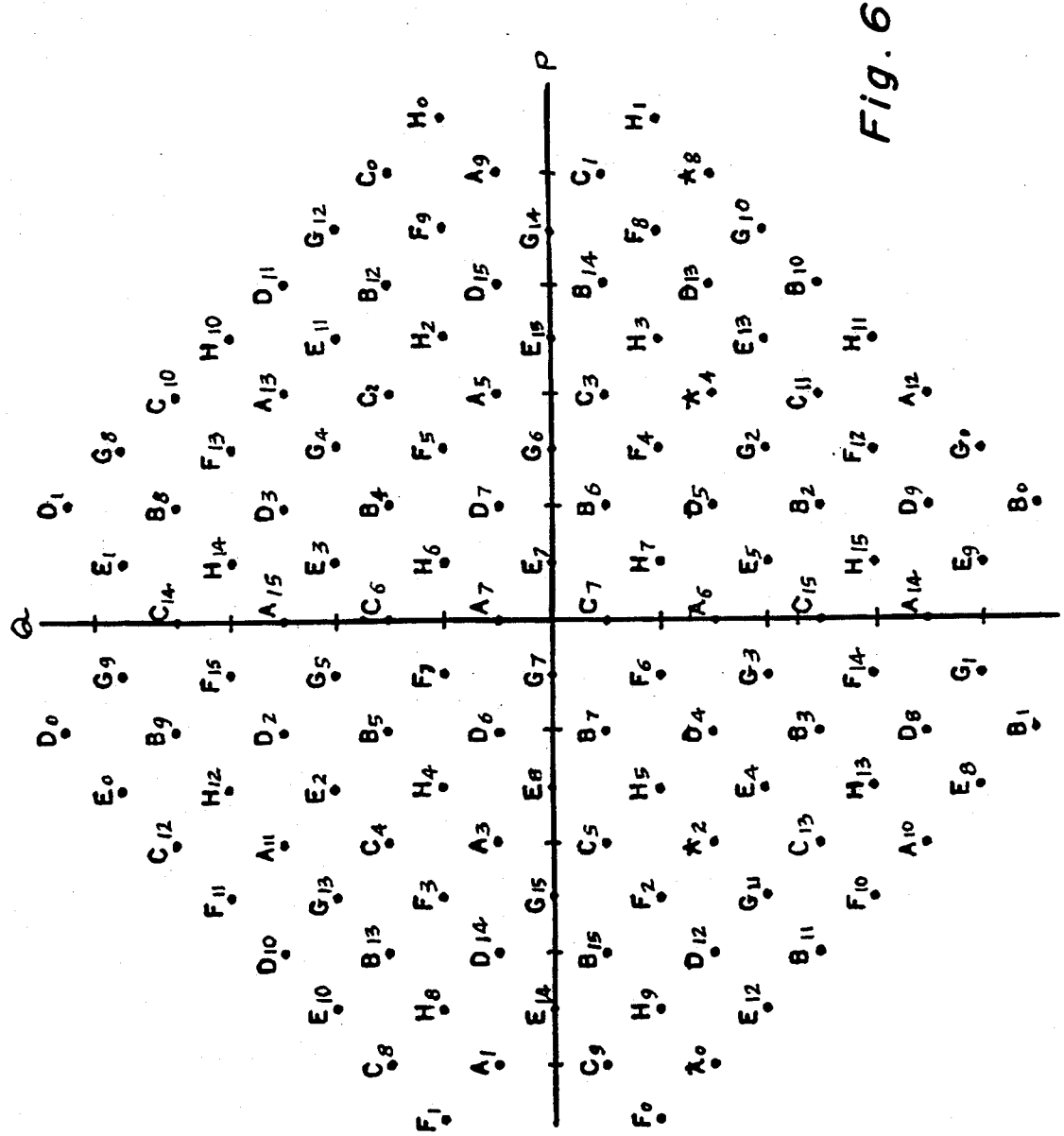

The outputs $Y_{2n}$, $Y_{1n}$ and $Y_{0n}$ of the convolutional encoder 62 and uncoded transmit data $Q_{6n}$, $Q_{5n}$, $Q_{4n}$ and $Q_{3n}$ are arranged at 128 signal points in the signal space shown in FIG. 5 according to the CCITT Recommendation V.33 in a mapping circuit 63. When, for instance, the inputs to the mapping circuit 63 are $Q_{6n}$, $Q_{5n}$, $Q_{4n}$, $Q_{3n}$, $Y_{2n}$, $Y_{1n}$ and $Y_{0n}$=0101000, the signal points are arranged at 4 on the horizontal (P) axis and 1 on the longitudinal (Q) axis. Therefore, the outputs P and Q of the mapping circuit 63 will be P=4 and Q=1. The eight kinds of outputs A, B, ..., H (each hereinafter referred to as a subset) of the aforementioned convolutional encoder 62 can have 16 combinations corresponding to the 16 alternative states that the transmit data $Q_{6n}$, $Q_{5n}$, $Q_{4n}$ and $Q_{3n}$ can take. To indicate the signal points in terms of the subsets A, B, ..., H, each point is arranged according to a mapping rule illustrated in FIG. 6. According to this rule, when the output of the convolutional encoder 62 is the subset A for instance, 16 signal points $A_0$ to $A_{15}$ are so mapped as to make the minimum distance between them equal to $2\sqrt{2}$ times the minimum distance between the 128 signal points. As a result, the data error (error rate) characteristic with respect to line noise is improved. The outputs P and Q of the mapping circuit 63, i.e. the outputs of the trellis coder 6, are subjected to QAM by a modulator (not shown), and sent out to the transmission path 3 as a trellis-coded test signal S(t) represented by Equation (1).

$$S(t) = Z \sin(W_c t) + P \cos(W_c t) \quad (1)$$

The delay equalizer 7 of the MODEM 1 shown in FIG. 1 receives via the transmission path 3 the trellis-coded test signal S(t) sent out from the MODEM 2. The test signal S(t), as it is affected by the group delay and noise on the line constituting the transmission path 3, is entered into the delay equalizer 7 as a test signal $S_a(t)$ represented by Equation (2). The equalizer 7 supplies a test signal $S_b(t)$ having gone through compensation for the group delay (equalization) on the transmission 3 to which the test signal $S_a(t)$ was subjected. This test signal $S_b(t)$ is represented by Equation (3).

$$S_a(t) = X_1(t)\sin(W_c t + \phi(t)) + X_2(t)\cos(W_c + \phi(t)) + n(t) \quad (2)$$

$$S_b(t) = X_1(t)\sin(W_c t + \phi'(t)) + X_2(t)\cos(W_c + \phi'(t)) + n'(t) \quad (3)$$

where $\phi(t)$ and $\phi'(t)$ are phase errors;

n(t) and n'(t) are noises;

$X_1$ is the output Q of the trellis coder, and $X_2$ is the output P of the trellis coder.

Figure 7:
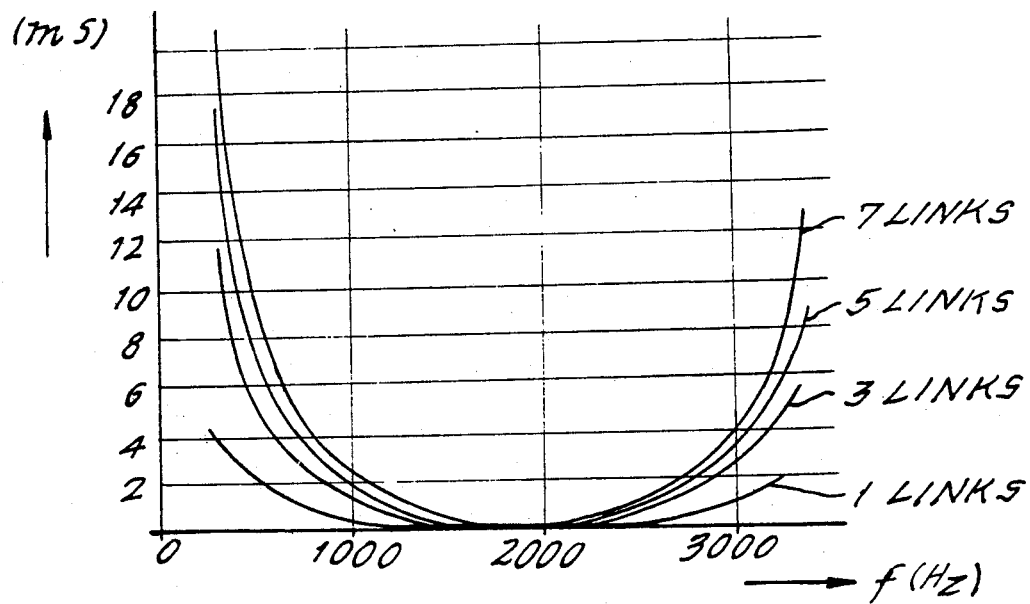
FIGS. 7 and 8 are diagrams for describing the characteristics of the delay equalizer in FIG. 1.
Figure 8:
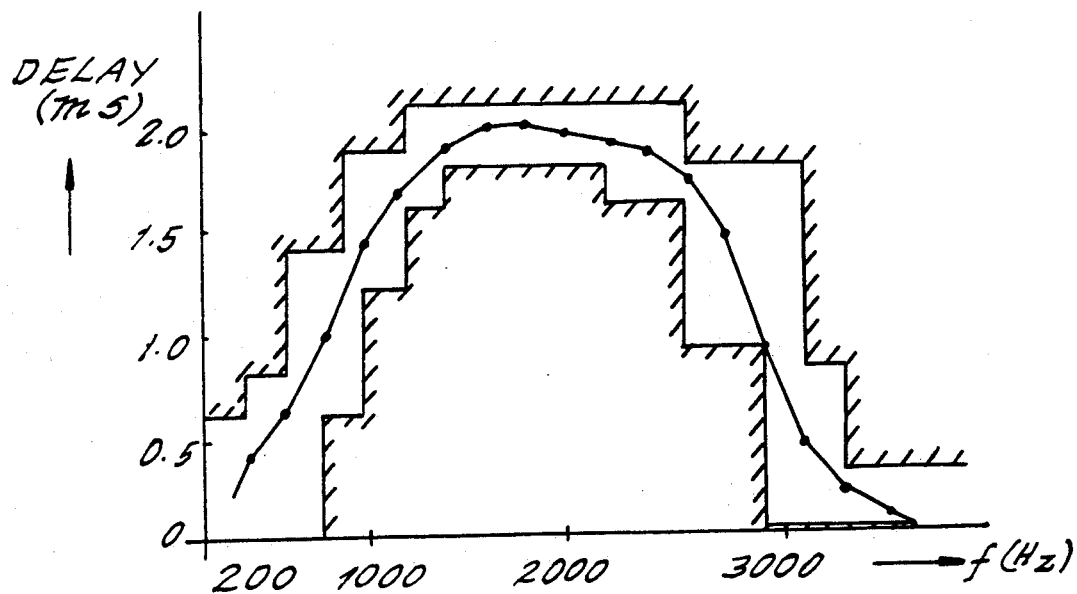

As an example of group delay on the line has the characteristic shown in FIG. 7, equalization of the group delay distortions by the delay equalizer 7 requires the equalizer 7 to consist of a filter having the characteristic shown in FIG. 8.

A first switching circuit 8 has a terminal 81 for receiving the test signal $S_b$ supplied by the delay equalizer 7, a terminal 82 for receiving the test signal $S_a$ entered via the transmission path directly, i.e. not through the equalizer 7, and a terminal 83 for selectively supplying the test signal $S_b(t)$ fed to the terminal 81 and the test signal $S_a(t)$ fed to the terminal 82. In this switching circuit 8, the selective setting of a first state in which the terminal 82 and the terminal 83 are connected or a second state in which the terminals 81 and 83 are connected is controlled by a controller 15 to be described below.

A demodulator 9 demodulates the signal $S_c(t)$ ($(S_c(t)=S_a(t)$ or $S_b(t))$, and supplies signals Re(t) and Im(t). The modulator 9 for QAM signals obtains a real part signal Re'(t) and an imaginary part signal Im'(t), respectively represented by Equations (4) and (5), by multiplying local oscillation signals cos ($W_c t$) and sin ($W_ct$), having a phase difference of $\pi/2(90°)$ between each other, and the signal $S_c(t)$.

$$Re'(t) = S_c(t) \cos(W_ct) \quad (4)$$

$$Im'(t) = S_c(t) \sin(W_ct) \quad (5)$$

These signals $Re'(t)$ and $Im'(t)$ are entered into a low-pass filter (not shown) in the demodulator 9 to be cleared of their quadratic harmonic contents. As a result, the demodulator 9 supplies the real part signal $Re(t)$ and the imaginary part signal $Im(t)$, respectively represented by Equations (6) and (7), as information on receive signal points.

$$S_c(t) = S_a(t) \begin{cases} Re(t) = 1/2 X_2(t) + n_2(t) & (6) \\ Im(t) = 1/2 X_1(t) + n_1(t) & (7) \end{cases}$$

$$S_c(t) = S_b(t) \begin{cases} Re(t) = 1/2 X_2(t) + n_2'(t) & (6) \\ Im(t) = 1/2 X_1(t) + n_1'(t) & (7) \end{cases}$$

Figure 9A:
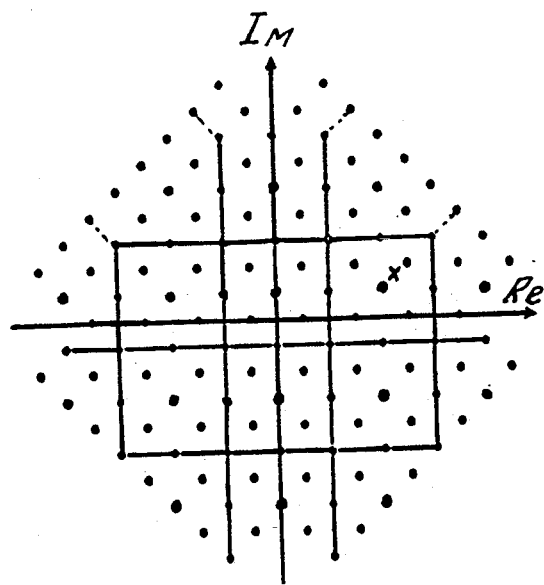
FIGS. 9A to 9H illustrate decision patterns of the decision circuit in FIG. 1.
Figure 9B:
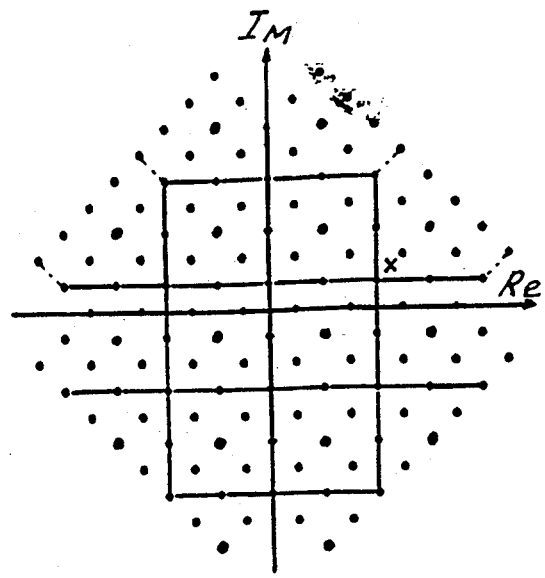
Figure 9C:
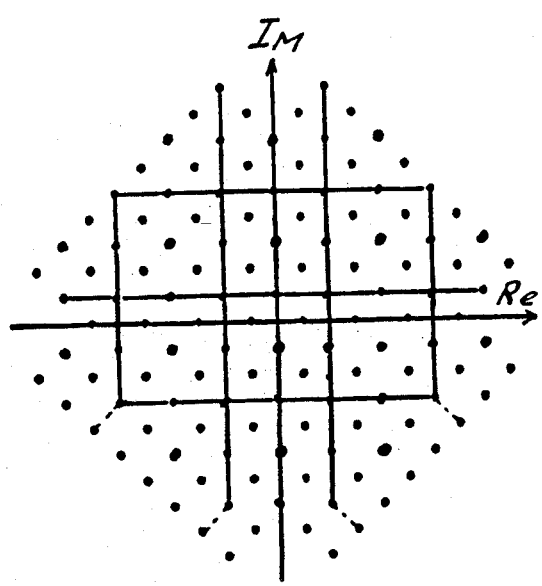
Figure 9D:
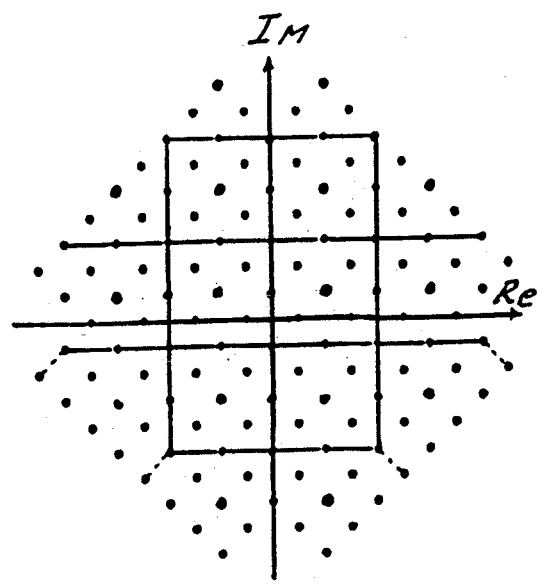
Figure 9E:
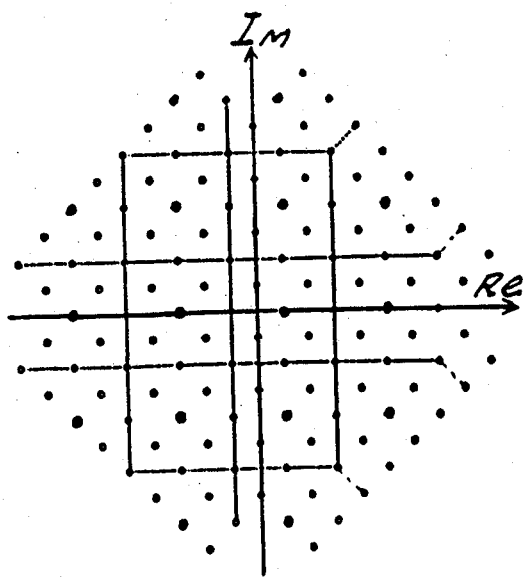
Figure 9F:
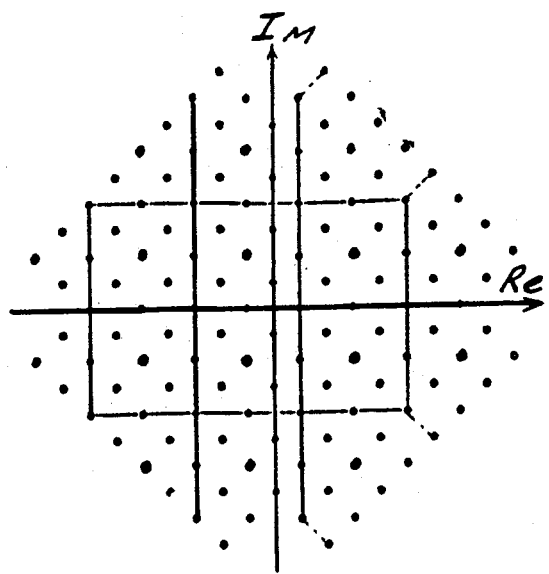
Figure 9G:
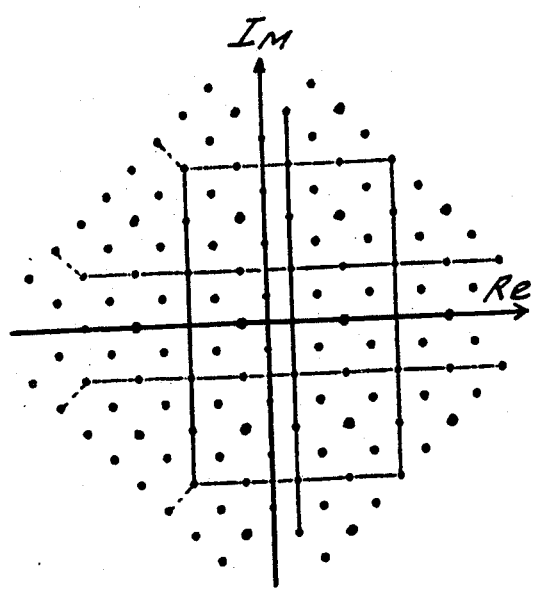
Figure 9H:
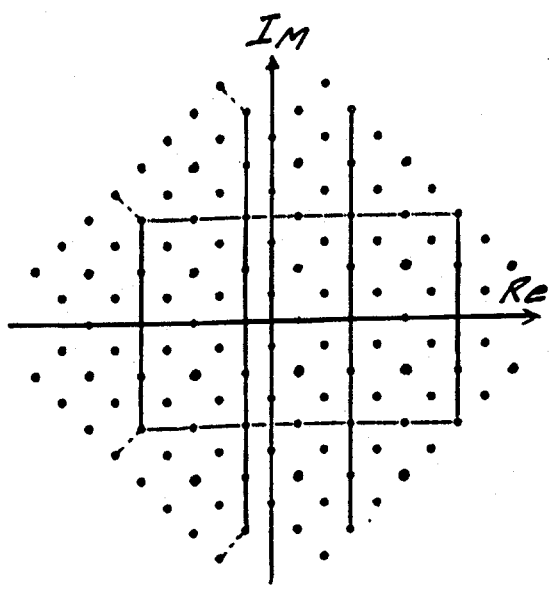

A decision circuit 10 give decisions on signal points on the coordinates of the signals $Re(t)$ and $Im(t)$, entered from the demodulator 9, in ecah of the eight patterns A, B, ..., H under the CCITT Recommendation V.33. FIGS. 9A to 9H illustrate the eight decision patterns A, B, ..., H, respectively. The coordinate positions of receive signal points (x, y) represented by the signal $Re(t)$ and $Im(t)$ are assigned to black dots (.) in the closes positions to the respective receive signal positions within the borers marked with dotted lines. As the decision circuit 10 gives decisions on receive signal points in the eight patterns, it outputs the eight decision results (assigned points) (X, Y). The transmit signal point of the test signal S(t) supplied from the trellis coder 6 of the opposite MODEM 2 is demodulated (reproduced) by the demodulator 9, and the coordinates (P, Q) of this transmit signal point correspond to the outputs $(X_2(t), X_1(t))$ of the demodulator 9. However, supposing the placement of the spatial coordinates of the transmit signal point and those of the receive signal point on the same scale, $X_2(t)$ and $X_1(T)$ of the signals $Re(t)$ and $Im(t)$ are multiplied by $\frac{1}{2}$ with respect to the signals P and Q (see Equations (6) and (7)), so that the signals $X_2(t)$ and $X_1(t)$ should be multiplied by 2. The signals $Re(t)$ and $Im(t)$ entered into the decision circuit 10 contain noise including a phase error ($\phi(t)$ or $\phi'(t)$) content. For these reasons, a receive signal point (x, y) usually corresponds to the position of neither a black dot (.) nor a white circle (o) on the coordinates of the decision pattern, but typically exists in an x-marked position as shown in FIGS. 9A and 9B. When a receive signal point (x, y) is in an x-marked position ((Re, Im)=(4.5, 1.3)), the decision circuit 10 assigns it to the black dot (.) of (re, Im)=(4, 1) in the direction pattern A (FIG. 9A) and to that (.) of (Re, Im)=(6, 3) in the decision pattern B (FIG. 9B). Although any more specific description is dispensed with here, the decision circuit 10 similarly assigns the receive signal point (x, y) to the closest black dot (.) within the same borders in every one of the other decisions patterns C, ..., H.

The eight decision results (X, Y) obtained by the decision circuit 10 in the decision patterns A, B, ..., H, together with the signals $Re(t)$ and $IM(t)$, i.e. information on the receive signal points (x, y), from the demodulator 9, are entered into a branch metric computing circuit 111 which constitutes a part of a Viterbi decoder 11. The branch metric computing circuit 111 subjects each of the eight decision results to arithmetic operation.

$$m^2 = (X-x)^2 + (Y-y)^2 \quad (8)$$

The arithmetic operation represented by Equation (8) gives the square of the Euclidean distance between a decision result (assigned point) (X, Y) and a receive signal point (s, y). This makes it possible to fine out branch metrics $m^2(m^2:m_a^2, m_b^2, m_c^2, \ldots m_h^2)$ for all the eight decision results. To give specific examples, the decision results (X, Y) and the receive signal points (x, y) in the aforementioned decision patterns A and B, the branch metrics $m_a^2$ and $m_b^2$ of the decision patterns A and B, respectively, are:

$$m_a^2 = (4-4.5)^2 + (1-1.3)^2 = 0.34$$

$$m_b^2 = (6-4.5)^2 + (3-1.3)^2 = 5.14$$

The eight branch metrics $m_a^2, m_b^2, m_c^2, \ldots, m_h^2$ obtained by the branch metric computing circuit 111 are entered into an adding, comparing and selecting (ACS) circuit 112, which constitutes a part of the Viberbi decoder 11. The ACS circuit 112 performs the arithmetic operations represented by Equations (9) on the basis of the branch metrics $m_a^2, m_b^2, m_c^2, \ldots, m_h^2$ and eight variables $M_0, M_1, \ldots, M_7$. The results obtained for $M_0$ to $M_7$ are called pass metrics.

$$\begin{aligned}
M_0 &= \min(M_0 + m_a^2, M_1 + m_d^2, M_5 + m_c^2, M_4 + m_b^2) \\
M_1 &= \min(M_0 + m_b^2, M_1 + m_c^2, M_5 + m_d^2, M_4 + m_a^2) \\
M_2 &= \min(M_0 + m_d^2, M_1 + m_a^2, M_5 + m_b^2, M_4 + m_c^2) \\
M_3 &= \min(M_0 + m_c^2, M_1 + m_b^2, M_5 + m_a^2, M_4 + m_d^2) \\
M_4 &= \min(M_2 + m_g^2, M_3 + m_f^2, M_7 + m_e^2, M_6 + m_h^2) \\
M_5 &= \min(M_2 + m_h^2, M_3 + m_e^2, M_7 + m_f^2, M_6 + m_g^2) \\
M_6 &= \min(M_2 + m_f^2, M_3 + m_g^2, M_7 + m_h^2, M_6 + m_e^2) \\
M_7 &= \min(M_2 + m_e^2, M_3 + m_h^2, M_7 + m_g^2, M_6 + m_f^2)
\end{aligned} \quad (9)$$

In more detail, the states being denominated state 0 ($W_{n1}, W_{n2}$ and $W_{n3}=000$) and state 1 ($W_{n1}, W_{n2}$ and $W_{n3}=001$) to state 7 ($W_{n1}, W_{n2}$ and $W_{n3}=111$) according to the values of the contents $W_{n1}, W_{n2}$ and $W_{n3}$ of the delay in the convolutional encoder 62 (see FIG. 2) of the trellis coder 6, the pass metrics $M_0, M_1, \ldots, M_7$ respectively correspond to the states 0 to 7. To take up the pass metric $M_0$ in Equations (9) as an example, it can be understood from the state transition diagram of FIG. 4 that the achievement of the state 0 requires one of the states 0, 1, 5 and 4 to be immediately preceding. The subsets corresponding to these states are A, D, B and C, respectively. If the subsets, A, B, ..., H correspond to the decision patterns A, B, ..., H and branch metrics $m_a^2, m_d^2, m_c^2$ and $m_b^2$ are accumulated into pass metrics $M_0, M_1, M_5$ and $M_4$, what is the smallest in value is likely to be the most probable in determining $M_0$, so that the least of the four values is selected. By computing $M_0$ through $M_7$ in this manner, the pass metrics of all the conceivable state transitions are computed.

The pass metrics $M_0, M_1, \ldots, M_7$ are the accumulated values of the transmit signal sequence and the receive signal sequence. Since the receive signal sequence having the smallest accumulated value should be the closest to the transmit signal sequence, a trace back circuit 113 can find the result of decoding by tracing back the smallest sequence of pass metrics $M_0, M_1, \ldots, M_7$. The output of the trace back circuit 113, which is the decoded result of the test signal $S_a(t)$, is not sent out from the MODEM 1 when the switch 4 is being operated. The trace back circuit 113, through constituting a part of the Viterbi decoder 11, is not directly related to the demonstration of the present invention.

The pass metrics $M_0, M_1, \ldots, M_7$ obtained by the ACS circuit 112 of the Viterbi decoder 11 are entered into both a maximum value selector 121 and a minimum value selector 122, which are constituents of a maximum difference arithmetic circuit 12. The maximum value selector 121 compares the values of the entered pass metrics $M_0, M_1, \ldots, M_7$ and selectively outputs the maximum value. The minimum value selector 122 compares the values of the entered pass metrics $M_0, M_1, \ldots, M_7$ and selectively outputs the minimum value. The maximum and minimum values of the pass metrics selected by the selectors 121 and 122, respectively, are subjected to subtraction by a subtractor 123, which is another constituent of the maximum difference arithmetic circuit. A difference signal Df from the subtractor 123 of the maximum difference arithmetic circuit 12 has a noise content. A low-pass filter 13 is provided to smoothen this difference signal Df.

A second switching circuit 14 has a first terminal 141 for receiving the difference signal Df from the filter 13, a second terminal 142 and a third terminal 143 both for selectively and distributively supplying the difference signal Df entered into the first terminal 141. In this second switching circuit 14, the selective setting of a first state in which the first terminal 141 and the third terminal 143 are connected or a second state in which the first terminal 141 and the second terminal 142 are connected is controlled by the controller 15 to be described below. This switching circuit 14, when set in its first state, passes such a difference signal (first difference signal) $Df_1$ between the maximum and minimum values of pass metrics as corresponds to the test signal $S_a(t)$ received in a state wherein the delay equalizer 7 is not set for the line and, when set in its second state, passes such a difference signal (second difference signal) $Df_2$ between the maximum and minimum values of pass metrics as corresponds to the test signal $S_b(t)$ of the output of the delay equalizer 7 set for the line.

The controller 15 comprises a memory circuit 151, a comparator 152 and a timing circuit 153. The memory circuit stores the first difference signal $Df_1$ from the second switching circuit 14. The comparator 152 compares the first difference signal $Df_1$ read out of the memory circuit 151 and the second difference signal $Df_2$ from the switching circuit 14. If the comparison shows the first difference signal $Df_1$ to be greater than the second difference signal $Df_2$, the comparator 152 supplies a signal (logical high level signal) for setting the first switching circuit 8 and the second switching circuit 14 in their respective first states. If the comparison shows the second difference signal $Df_2$ to be greater than the first difference signal $Df_1$, the comparator 152 supplies a first timing signal (logical low level signal) for setting the first switching circuit 8 and the second switching circuit 14 in their respective second states. The timing circuit 153, when the switch 4 is operated, supplies for a prescribed length of time a second timing signal (logical high level signal) for first setting the first switching circuit 8 and the second switching 14 in their respective first states, and then outputs a signal (logical low level signal) for switching the setting to place the first switching circuit 8 and the second switching circuit 14 in their respective second states. The timing circuit 153, with the lapse of a prescribed length of time after supplying the second timing signal, places its output in a high impedance state. The comparator 152 keeps its output in a high impedance state while the timing circuit 153 is operating.

In judging whether the delay equalizer 7 should be set for the transmission path (line) 3 of the data transmission system described above, the installing technician (or the lay user) would operate the switch 4 when the MODEM 1 is not transmitting data or at the time of installing the MODEM 1. In response to the operation of the switch 4, the test signal transmission request circuit 5 sends out a signal TREQ to request the opposite MODEM 2 to transmit a trellis-coded test signal S(t). The MODEM 1 receives the test signal S(t) via the transmission path 3 from the MODEM 2 having received the signal TREQ as the test signal $S_a(t)$ In the MODEM 1, the timing circuit 153 of the controller 15 sets the first switching circuit 8 and the second switching circuit 14 in their respective first states in synchronism with the operation of the switch 4 and, after the lapse of a prescribed length of time, switches the first switching circuit 8 and the second switching circuit 14 into their respective second states. Therefore, the test signal $S_a(t)$ is first entered as the test signal $S_c(t)$ into the demodulator 9 not via the delay equalizer 7 but through the first switching circuit 8. Signals Re(t) and Im(t) demodulated by this demodulator 9 are entered into the decision circuit 10, which assigns them to predetermined signal point coordinates (see FIGS. 9A to 9H). The Viterbi decoder 11 decodes the output signals of the decision circuit 10 and supplies the decoded data of the test signal $S_c(t)$ This Viterbi decoder 11, with its branch metric computing circuit 111 and ACS circuit 112, computes branch metrics $m_a^2, m_b^2, m_c^2, \ldots, m_h^2$ from the output signals of the decision circuit 10, and figures out the pass metrics $M_0, M_1, \ldots, M_7$ from these computed branch metrics. In the maximum difference arithmetic circuit 12 consisting of the maximum value selector 121, the minimum value selector 122 and the subtractor 123, the subtractor 123 supplies the difference between the maximum pass metric value outputted by the maximum value selector 121 and the minimum pass metric value outputted by the minimum value selector 122 as the difference signal Df. The difference signal Df supplied by this subtractor 123 is smoothened by a low-pass filter 13 and entered into the second switching circuit 14. Since, at this time, the second switching circuit 14 is set in its first state by the timing circuit 153, the entered difference signal Df is stored in the memory circuit 151 as the first difference signal $Df_1$.

After the lapse of a prescribed length of time following the reception of the test signal $S_a(t)$ from the MODEM 2, i.e. the length of time required for the above described processing to store the first difference signal $Df_1$ into the memory circuit 151, the timing circuit 153 sets the first switching circuit 8 and the second switching circuit 14 into their respective second states. Therefore, the next test signal $S_a(t)$ received from the MODEM 2 is entered into the demodulator 9 via the delay equalizer 7 as the test signal $S_c(t)$ ($S_b(t) = S_c(t)$). The decision circuit 10, the Viterbi decoder 11, the arithmetic circuit 12 and the filter 13 operate in the same manner as when the test signal does not come via the delay equalizer 7 to enter the difference signal Df into the second switching circuit 14. Since this second switching circuit 14, as stated above, is set in its second state, the entered difference signal Df is outputted from the terminal 142 as the second difference signal $Df_2$.

As a result of the above described processing, the difference between the maximum and minimum values of the pass metric when the delay equalizer 7 is not inserted on the line is stored into the memory circuit 151 of the controller 15, and from the second switching circuit 14 is entered the difference between the maximum and minimum values of the pass metric when the delay equalizer 7 is inserted. The difference between the maximum and minimum values of the pass metric is proportional to the error rate, and it is generally known to those skilled in the art that the greater this difference the higher the line quality (the quality of communication signals). The comparator 152 of the controller 15 compares the first difference signal $Df_1$ stored in the memory circuit 151 and the second difference signal $Df_2$ entered from the second switching circuit 14 and, when the second difference signal $Df_2$ is greater than the first difference signal $Df_1$, supplies a signal for holding the first switching circuit 8 and the second switching circuit 14 in their respective second states. When the first difference signal $Df_1$ is greater than the second difference signal $Df_2$, the comparator 152 supplies a signal for setting the first switching circuit 8 and the second switching circuit 14 in their respective first states. Thus the comparator 152 performs setting control so as to increase the difference between the maximum and minimum values of the pass metric by inserting, or not inserting, the delay equalizer 7.

When the switch 4 is operated for restoration after the completion of the series of operations, the transmission of the test signal S(t) from the opposite MODEM 2 is discontinued. After the delay equalizer 7 has been set as described above, the first switching circuit 8 holds on to its set state unless the setting is altered.

In the preferred embodiment described above, only those constitutent elements of the MODEM's 1 and 2 which are relevant to the description of the present invention were referred to, and the unmentioned elements are the same as the corresponding ones in usual MODEM s. The first switching circuit 8 and the second switching circuit 14 can consist of either electronic or mechanical switches. Further, although the memory circuit 151, the comparator 152 and the timing circuit 153 are the constituent elements of the controller 15 in the foregoing, they may as well be independent or integrated with some other constituent elements. The memory circuit 151 can be arranged on the side of the second terminal 142 of the second switching circuit 14 instead of that of the third terminal 143 of same, in which case the switching circuits 8 and 14 may be set first in their respective second states by the output of the timing circuit 153 and later set in the first states.

Other alternatives and modifications to the above-mentioned embodiment can be made within the scope of the invention defined by the appended claims.

What is claimed is:

1. A modulating and demodulating device (MODEM) for data transmission systems, comprising:
   delay equalizing means for receiving via a transmission path a trellis-coded test signal transmitted from an opposite MODEM and compensating for delay distortion on said transmission path of said test signal;
   first switching means which can take either a first state wherein said test signal is supplied not via said delay equalizing means or a second state wherein the output signal of said delay equalizing means is supplied;
   demodulating means for demodulating the output signals of said first switching means;
   decision means for assigning the output signals of said demodulating means to predetermined signal point coordinates;
   Viterbi decoding means for computing branch metrics representing the distance between each assigned point and each receive signal point from the output signals of said decision means and said demodulating means, and figuring out pass metrics of accumulated values based on the computed branch metrics;
   arithmetic processing means for selecting the maximum and the minimum of said pass metrics from said viterbi decoding means, and determining and outputting the difference between said selected maximum and minimum as a difference signal;
   second switching means for supplying said difference signal determined by said arithmetic processing means as a first difference signal when said first switching means is in said first state and as a second difference signal when said first switching means is in said second state; and
   control means for comparing said first and second difference signals supplied by said second switching means, and holding said first switching means in said first state when said first difference signal is greater than said second difference signal, or holding said first switching means in said second state when said second difference signal is greater than said first difference signal.

2. A MODEM for data transmission systems, as claimed in claim 1, in which said Viterbi decoding means comprises first means for computing the branch metric representing the distance between each assigned point and receive signal point from the output signals of said decision means, said demodulating means, and second means for figuring out the pass metrics of accumulated values based on said branch metrics computed by the first means.

3. A MODEM for data transmission systems, as claimed in claim 1, in which said arithmetic processing means comprising first selecting means for selecting the maximum value of said pass metrics from said Viterbi decoding means; second selecting means for selecting the minimum value of said pass metrics from said Viterbi decoding means; and subtracting means for computing the difference between said maximum value form said first selecting means and said minimum value from said second selecting means.

4. A MODEM for data transmission systems, as claimed in claim 1, further including filtering means for smoothing said difference signal supplied by said arithmetic processing means and entering it into said second switching means.

5. A MODEM for data transmission systems, as claimed in claim 1, in which said control means includes memory means for storing said first difference signal supplied from said second switching means.

6. A MODEM for data transmission systems, as claimed in claim 3, including memory means for storing one of said first and second difference signals supplied from said second switching means which is supplied earlier, and supplying it to said control means for comparison with the other signal which is supplied later.

7. A MODEM for data transmission systems, claimed in claim 1, in which said control means includes means for performing setting control over said first and second switching means so as to successively enter said first difference signal and said second difference signal into said control means.

8. A MODEM for data transmission systems, as claimed in claim 5, including means for performing setting control over said first and second switching means so as to successively enter said first difference signal and said second difference signal into said control means.

9. A MODEM for data transmission systems, as claimed in claim 2, in which said arithmetic processing means comprising first selecting means for selecting the maximum value of said pass metrics from said Viterbi decoding means; second selecting means for selecting the minimum value of said pass metrics from said Viterbi decoding means; and subtracting means for computing the difference between said maximum value from said first selecting means and said minimum value from said second selecting means.

* * * * *